United States Patent
Wu et al.

(10) Patent No.: US 12,145,268 B2
(45) Date of Patent: Nov. 19, 2024

(54) INVERSE OPTIMAL CONTROL FOR HUMAN APPROACH

(71) Applicant: Honda Motor Co., Ltd., Tokyo (JP)

(72) Inventors: Xingwei Wu, Sunnyvale, CA (US); Yalun Wen, Bryan, TX (US); Katsu Yamane, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 17/544,274

(22) Filed: Dec. 7, 2021

(65) Prior Publication Data

US 2023/0091806 A1 Mar. 23, 2023

Related U.S. Application Data

(60) Provisional application No. 63/247,461, filed on Sep. 23, 2021.

(51) Int. Cl.
*B25J 9/16* (2006.01)

(52) U.S. Cl.
CPC ........... *B25J 9/1607* (2013.01); *B25J 9/1633* (2013.01); *B25J 9/1664* (2013.01)

(58) Field of Classification Search
CPC ...... B25J 9/1607; B25J 9/1633; B25J 9/1664; G05D 1/0217
USPC ....................................................... 700/262
See application file for complete search history.

(56) References Cited

FOREIGN PATENT DOCUMENTS

CN 109947119 B * 6/2021
CN 113156966 A * 7/2021

OTHER PUBLICATIONS

K. Mombaur, A. Truong, and J .- p. Laumond, "From human to humanoid locomotion—an inverse optimal control approach," Autonomous robots, vol. 28, No. 3, pp. 369-383, 2010 (Year: 2010).*
Carton, D., Turnwald, A., Wollherr, D., & Buss, M. (2013). "Proactively approaching pedestrians with an autonomous mobile robot in urban environments." In Experimental Robotics: The 13th International Symposium on Experimental Robotics (pp. 199-214). Springer International Publishing (Year: 2013).*

(Continued)

*Primary Examiner* — Jonathan L Sample
*Assistant Examiner* — James Miller Watts, III
(74) *Attorney, Agent, or Firm* — RANKIN, HILL & CLARK LLP

(57) ABSTRACT

A controller for an inverse optimal control approach robot may control movement of a robot body toward a human target along a trajectory according to a cost function. The cost function may include many terms. A first term may be associated with a duration of the trajectory for the robot. A second term may be associated with a social force and a final distance between the robot and the human target. A third term may be associated with a lateral acceleration for the robot. A fourth term may be associated with an angular acceleration for the robot. A fifth term may be associated with a longitudinal acceleration for the robot. A sixth term may be associated with a reduction of centrifugal force applied to the robot body.

20 Claims, 9 Drawing Sheets

(56) References Cited

OTHER PUBLICATIONS

R. Kirby, R. Simmons, and J. Forlizzi. Companion: A constraint optimizing method for person-acceptable navigation. In Proc. of the IEEE Int. Symposium on Robot and Human Interactive Communication (RO-MAN), 2009 https://www.ri.cmu.edu/pub_files/2009/9/ 0111.pdf (Year: 2009).*
G. Ferrer, A. Garrell and A. Sanfeliu, "Robot companion: A social-force based approach with human awareness-navigation in crowded environments, " 2013 IEEE/RSJ International Conference on Intelligent Robots and Systems, Tokyo, Japan, 2013, pp. 1688-1694, doi: 10.1109/IROS.2013.6696576. (Year: 2013).*
Behrang Mohajer, Kourosh Kiani, Ehsan Samiei, Mostafa Sharifi, "A New Online Random Particles Optimization Algorithm for Mobile Robot Path Planning in Dynamic Environments", Mathematical Problems in Engineering, vol. 2013, Article ID 491346, 2013. https://doi.org/10.1155/2013/491346 (Year: 2013).*
P. Althaus, H. Ishiguro, T. Kanda, T. Miyashita, and H. I. Christensen, "Navigation for human-robot interaction tasks," In IEEE International Conference on Robotics and Automation, 2004. Proceedings. ICRA'04. 2004, vol. 2. IEEE, 2004, pp. 1894-1900.
C. G. L. Bianco, "Minimum-jerk velocity planning for mobile robot applications," IEEE Transactions on Robotics, vol. 29, No. 5, pp. 1317-1326, 2013.
W. Burgard, A. B. Cremers, D. Fox, D. Hahnel, G. Lakemeyer, D. Schulz, W. Steiner, and S. Thrun, "Experiences with an interactive museum tour-guide robot," Artificial intelligence, vol. 114, No. 1-2, pp. 3-55, 1999.
D. Carton, A. Turnwald, D. Wollherr, and M. Buss, "Proactively approaching pedestrians with an autonomous mobile robot in urban environments," in Experimental Robotics. Springer, 2013, pp. 199-214.
D. Carton, W. Olszowy, D. Wollherr, and M. Buss, "Socio-contextual constraints for human approach with a mobile robot," International Journal of Social Robotics, vol. 9, No. 2, pp. 309-327, 2017.
C. Chen, Y. Liu, S. Kreiss, and A. Alahi, "Crowd-robot interaction: Crowd-aware robot navigation with attention-based deep reinforcement learning," in 2019 International Conference on Robotics and Automation (ICRA). IEEE, 2019, pp. 6015-6022.
K. Dautenhahn, M. Walters, S. Woods, K. L. Koay, C. L. Nehaniv, A. Sisbot, R. Alami, and T. Siméon, "How may I serve you? A robot companion approaching a seated person in a helping context," in Proceedings of the 1st ACM SIGCHI/SIGART conference on Humanrobot interaction, 2006, pp. 172-179.
D. Feil-Seifer, K. S. Haring, S. Rossi, A. R. Wagner, and T. Williams, "Where to next? the impact of covid-19 on human-robot interaction research," 2020.
A. Gupta, J. Johnson, L. Fei-Fei, S. Savarese, and A. Alahi, "Social gan: Socially acceptable trajectories with generative adversarial networks," in Proceedings of the IEEE Conference on Computer Vision and Pattern Recognition, 2018, pp. 2255-2264.
E. T. Hall, The hidden dimension. Garden City, NY: Doubleday, 1966, vol. 609.
P. Helbing and P. Molnar, "Social force model for pedestrian dynamics," Physical review E, vol. 51, No. 5, p. 4282, 1995.

G. Hoffman and X. Zhao, "A primer for conducting experiments in human-robot interaction," ACM Transactions on Human-Robot Interaction (THRI), vol. 10, No. 1, pp. 1-31, 2020.
H. Kretzschmar, M. Spies, C. Sprunk, and W. Burgard, "Socially compliant mobile robot navigation via inverse reinforcement learning," the International Journal of Robotics Research, vol. 35, No. 11, pp. 1289-1307, 2016.
C. Lichtenthaäler, T. Lorenz, and A. Kirsch, "Influence of legibility on perceived safety in a virtual human-robot path crossing task," in IEEE International Symposium on Robot and Human Interactive Communication (RO-MAN), 2012, pp. 676-681.
Y. Lo, K. Yamane, and K.-i. Sugiyama, "Perception of pedestrian avoidance strategies of a self-balancing mobile robot," in 2019 IEEE/RSJ International Conference on Intelligent Robots and Systems (IROS). IEEE, 2019, pp. 1243-1250.
Manh and G. Alaghband, "Scene-lstm: A model for human trajectory prediction," arXiv preprint arXiv:1808.04018, 2018.
Mavrogiannis, A. M. Hutchinson, J. Macdonald, p. Alves-Oliveira, and R. A. Knepper, "Effects of distinct robot navigation strategies on human behavior in a crowded environment," in 2019 14th ACM/IEEE International Conference on Human-Robot Interaction (HRI). IEEE, 2019, pp. 421-430.
C. I. Mavrogiannis, W. B. Thomason, and R. A. Knepper, "Social momentum: A framework for legible navigation in dynamic multi-agent environments," in Proceedings of the 2018 ACM/IEEE International Conference on Human-Robot Interaction, 2018, pp. 361-369.
A. Mohamed, K. Qian, M. Elhoseiny, and C. Claudel, "Social-stgcnn: A social spatio-temporal graph convolutional neural network for human trajectory prediction," in Proceedings of the IEEE/CVF Conference on Computer Vision and Pattern Recognition, 2020, pp. 14 424-14 432.
K. Mombaur, A. Truong, and J.-P. Laumond, "From human to humanoid locomotion—an inverse optimal control approach," Autonomous robots, vol. 28, No. 3, pp. 369-383, 2010.
Natrualpoint, Inc., "Optitrack—hardware," https://optitrack.com/hardware/.
S. Satake, T. Kanda, D. F. Glas, M. Imai, H. Ishiguro, and N. Hagita, "How to approach humans? strategies for social robots to initiate interaction," in Proceedings of the 4th ACM/IEEE international conference on Human robot interaction, 2009, pp. 109-116.
M. Shiomi, T. Kanda, D. F. Glas, S. Satake, H. Ishiguro, and N. Hagita, "Field trial of networked social robots in a shopping mall," in 2009 IEEE/RSJ International Conference on Intelligent Robots and Systems. IEEE, 2009, pp. 2846-2853.
R. Siegwart, K. O. Arras, S. Bouabdallah, D. Burnier, G. Froidevaux, X. Greppin, B. Jensen, A. Lorotte, L. Mayor, M. Meisser, et al., "Robox at expo. 02: A large-scale installation of personal robots," Robotics and Autonomous Systems, vol. 42, No. 3-4, pp. 203-222, 2003.
S. Thrun, M. Bennewitz, W. Burgard, A. B. Cremers, F. Dellaert, D. Fox, D. Hahnel, C. Rosenberg, N. Roy, J. Schulte, et al., "Minerva: A second-generation museum tour-guide robot," in Proceedings 1999 IEEE International Conference on Robotics and Automation (Cat. No. 99CH36288C), vol. 3. IEEE, 1999.
S. N. Woods, M. L. Walters, K. L. Koay, and K. Dautenhahn, "Methodological issues in hri: A comparison of live and video-based methods in robot to human approach direction trials," in ROMAN 2006-the 15th IEEE international symposium on robot and human interactive communication. IEEE, 2006, pp. 51-58.

* cited by examiner

INVERSE OPTIMAL CONTROL FOR HUMAN APPROACH

CROSS-REFERENCE TO RELATED APPLICATIONS

This application claims the benefit of U.S. Provisional Patent Application, Ser. No. 63/247,461 entitled "INVERSE OPTIMAL CONTROL FOR HUMAN APPROACH", filed on Sep. 23, 2021; the entirety of the above-noted application(s) is incorporated by reference herein.

BACKGROUND

Originally, robots developed for museums and exhibitions did not implement any approach functionality. Instead, these robots used display and speech to encourage visitors to approach them. Later robots utilized a straight line approach for approaching humans. Approaching a person for initiating an interaction is an essential skill for social robots but planning an appropriate trajectory may be difficult because the robot should come in front of the person at a reasonably small distance without making the person feel uncomfortable. It may be desirable to have the robot approach the person in a socially compliant manner.

While the effect of parameters such as the distance between interacting agents in social interactions has been investigated, it is unclear how more subtle differences, such as the trajectory shape affects the social acceptance. The perception may depend on the social norm of a particular culture, which may be difficult to program.

BRIEF DESCRIPTION

According to one aspect, an inverse optimal control approach robot may include a robot body and a controller. The controller may control movement of the robot body toward a human target along a trajectory according to a cost function. The cost function may include a first term and a second term. The first term may be associated with a duration of the trajectory for the inverse optimal control approach robot. The second term may be associated with a social force and a final distance between the inverse optimal control approach robot and the human target.

The cost function may include the first term, the second term, a third term, a fourth term, a fifth term, and a sixth term. The third term may be associated with a lateral acceleration for the inverse optimal control approach robot. The fourth term may be associated with an angular acceleration for the inverse optimal control approach robot. The fifth term may be associated with a longitudinal acceleration for the inverse optimal control approach robot. The sixth term may be associated with a reduction of centrifugal force applied to the robot body.

The trajectory may be obtained based on an inner optimization. The controller may control movement of the robot body toward the human target along the trajectory based on the inner optimization.

The cost function may be obtained based on an outer optimization. The first term, the second term, the third term, the fourth term, the fifth term, and the sixth term may be associated with a first weight, a second weight, a third weight, a fourth weight, a fifth weight, and a sixth weight, respectively. One or more of the first weight, the second weight, the third weight, the fourth weight, the fifth weight, or the sixth weight may be optimized in two or more stages. During a first stage of the two or more stages, the weights of less than all of the terms of the cost function may be considered for optimization while keeping the weights of the non-considered terms fixed. During a first stage of two or more stages of optimization, the outer optimization may be based only on input terms to determine a first set of weights. During a second stage of the two or more stages of optimization, the outer optimization may be based on the first set of weights.

The social force may be modeled based on a current position of the inverse optimal control approach robot relative to the human target.

According to one aspect, an inverse optimal control approach system may include a robot body and a controller. The controller may control movement of the robot body toward a human target along a trajectory according to a cost function. The cost function may include a first term and a second term. The first term may be associated with a duration of the trajectory for the robot body. The second term may be associated with a social force and a final distance between the robot body and the human target.

The cost function may include a first term, a second term, a third term, a fourth term, a fifth term, and a sixth term. The third term may be associated with a lateral acceleration for the robot body. The fourth term may be associated with an angular acceleration for the robot body. The fifth term may be associated with a longitudinal acceleration for the robot body. The sixth term may be associated with a reduction of centrifugal force applied to the robot body.

The trajectory may be obtained based on an inner optimization. The first term, the second term, the third term, the fourth term, the fifth term, and the sixth term may be associated with a first weight, a second weight, a third weight, a fourth weight, a fifth weight, and a sixth weight, respectively. One or more of the first weight, the second weight, the third weight, the fourth weight, the fifth weight, or the sixth weight may be optimized in two or more stages. During a first stage of the two or more stages, the weights of less than all of the terms of the cost function may be considered for optimization while keeping the weights of the non-considered terms fixed.

The social force may be modeled based on a current position of the inverse optimal control approach robot relative to the human target.

According to one aspect, an inverse optimal control approach method may include optimizing a cost function and controlling movement of a robot body toward a human target along a trajectory according to the cost function. The cost function may include a first term, a second term, and a third term. The first term may be associated with a duration of the trajectory for the robot body. The second term may be associated with a social force and a final distance between the robot body and the human target. The third term may be associated with an acceleration for the robot body.

The cost function may include the first term, the second term, the third term, a fourth term, a fifth term, and a sixth term. The third term may be associated with a lateral acceleration for the robot body. The fourth term may be associated with an angular acceleration for the robot body. The fifth term may be associated with a longitudinal acceleration for the robot body. The sixth term may be associated with a reduction of centrifugal force applied to the robot body.

The first term, the second term, the third term, the fourth term, the fifth term, and the sixth term may be associated with a first weight, a second weight, a third weight, a fourth weight, a fifth weight, and a sixth weight, respectively. The inverse optimal control approach method may include optimizing one or more of the first weight, the second weight, the third weight, the fourth weight, the fifth weight, or the sixth weight during two or more stages. During a first stage of the two or more stages, the weights of less than all of the terms of the cost function may be considered for optimization while keeping the weights of the non-considered terms fixed.

DETAILED DESCRIPTION

Figure 1:
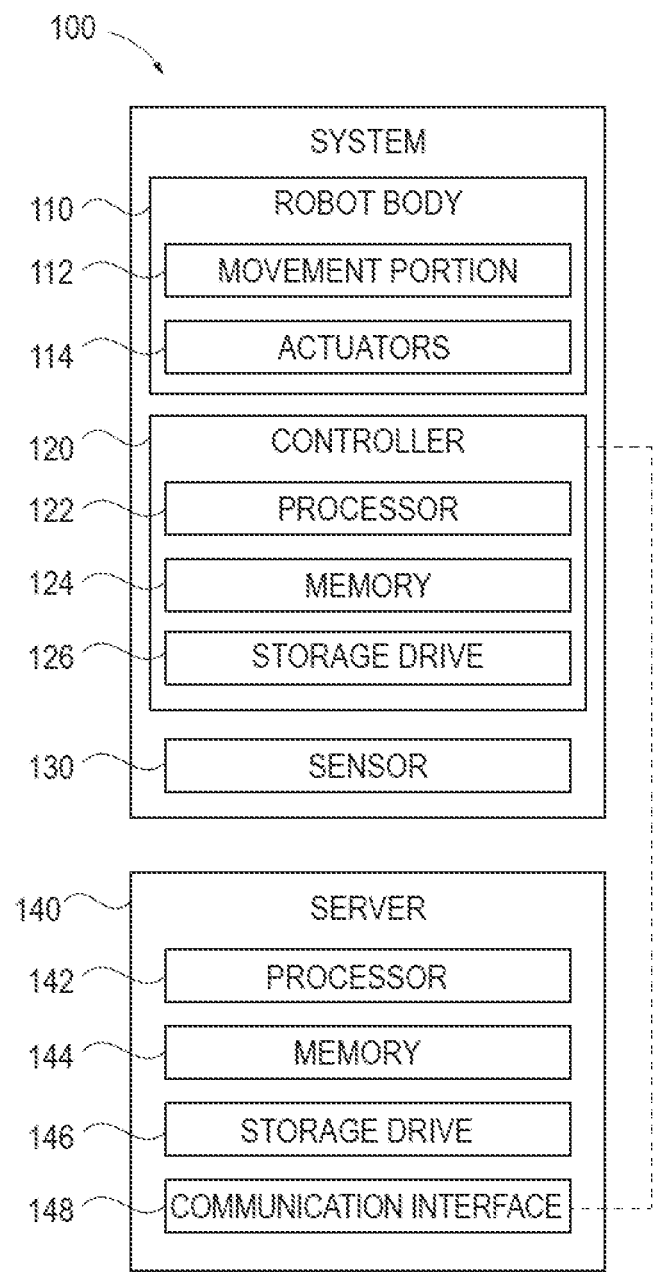
FIG. 1 is an exemplary component diagram of a system or robot for inverse optimal control approach, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a bus that interconnects components inside a robot or vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "robot system", as used herein, may be any automatic or manual systems that may be used to enhance the robot. Exemplary robot systems include an autonomous operation system, an electronic stability control system, a brake system, a brake assist system, a collision warning system, a sensor system, a navigation system, visual devices (e.g., camera systems, proximity sensor systems), a monitoring system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system 100 or robot for inverse optimal control approach, according to one aspect. The system 100 for inverse optimal control approach may be an inverse optimal control approach robot.

The system 100 for inverse optimal control approach may include a robot body 110. The robot body 110 may include a movement portion 112, such as a set of wheels or tracks, legs, etc. which allow the robot body 110 to move. Additionally, the robot body 110 may include actuators 114 which may be driven by a controller 120. The system 100 for inverse optimal control approach may include the controller 120. The controller 120 may be implemented via a processor 122, a memory 124, a storage drive 126, one or more busses, etc. Respective components may be communicatively coupled and/or in computer communication with one another. The system 100 for inverse optimal control approach may further include one or more sensors or a set of sensors 130, which may detect one or more objects or obstacles in the environment as well was a human target.

Inverse Optimal Control

The system 100 for inverse optimal control approach may enable an inverse optimal control approach for mobile robots to approach a human (e.g., human target) in a socially acceptable manner. According to one aspect, the controller 120 may control movement of the robot body 110 toward a human target along a trajectory according to a cost function. The inverse optimal control may be used to find a cost function that may be used to create a robot trajectory which mimics human trajectory observed from datasets.

The cost function may be calculated or optimized by the processor 120 of the controller 120 or may be optimized offline, via a server 140, which may be implemented via a processor 142, a memory 144, and a storage drive 146. A communication interface 148 of the server 140 may transmit the cost function to the controller 120 of the system 100 for inverse optimal control approach.

In general, the dynamics of a mobile robot such as the system 100 for inverse optimal control approach or robot may be represented by a differential equation:

$$\dot{x}(t) = f(x(t), u(t)) \quad (1)$$

where x(t) may be a current state and u(t) may be the input.

Figure 3:
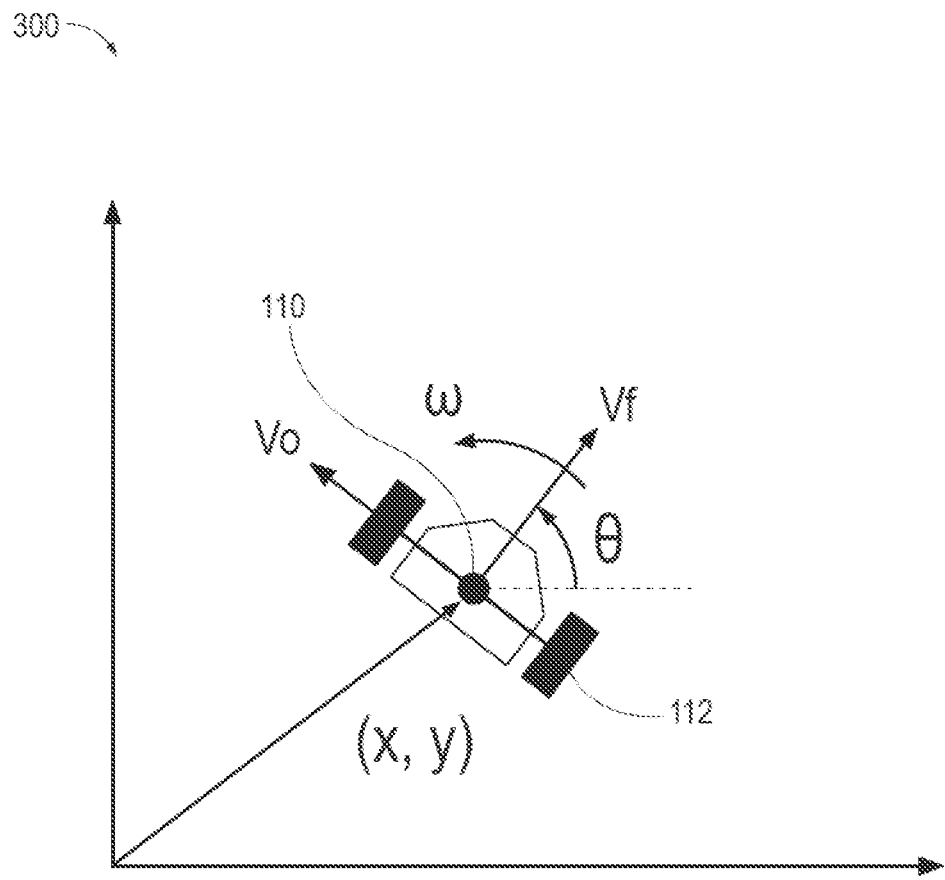
FIG. 3 is an exemplary diagram of a system or robot for inverse optimal control approach, according to one aspect.

Using the differential drive model with an additional velocity component orthogonal to the direction, as seen in FIG. 3, x and u may be represented as:

$$x(t) = (x(t) y(t) \theta(t) v_f(t) v_o(t) \omega(t))^T \quad (2)$$

$$u(t) = (u_1(t) u_2(t) u_3(t))^T \quad (3)$$

inputs may be selected as $u_1(t) = \dot{v}_f(t)$, $u_2(t) = \dot{v}_o(t)$ and $u_3(t) = \dot{\omega}(t)$, yielding $$f(x(t), u(t)) = (\dot{x}(t) \dot{y}(t) \dot{\omega}(t) u_1(t) u_2(t) u_3(t))^T \quad (4)$$

where $$\dot{x}(t) = v_f(t) \cos\theta(t) - v_o(t) \sin\theta(t) \quad (5)$$

$$\dot{y}(t) = v_f(t) \sin\theta(t) + v_o(t) \cos\theta(t) \quad (6)$$

One or more limits may be imposed on respective velocities and inputs:

$$0 \leq v_f(t) \leq v_{fmax} \quad (7)$$

$$-v_{omax} \leq v_o(t) \leq v_{omax} \quad (8)$$

$$-\omega_{max} \leq \omega_{max} \quad (9)$$

$$-u_{1max} \leq u_1(t) \leq u_{1max} \quad (10)$$

$$-u_{2max} \leq u_1(t) \leq u_{2max} \quad (11)$$

$$-u_{3max} \leq u_1(t) \leq u_{3max} \quad (12)$$

The dependency on time may be omitted hereinafter for simplicity of notation.

f (*) may be a function that describes a dynamics model, such as the model from Equation (4), 0 may be an object side velocity, ω may be angular velocity, $u_1$ may be longitudinal acceleration, $u_2$ may be lateral acceleration, $u_3$ may be angular acceleration, $x_e$, $y_e$ may be the goal position, x, y may be a current position.

Point-to-Point Trajectory Optimization

Inverse optimal control may involve two optimizations, such as an inner optimization for obtaining the optimal trajectory that minimizes a given cost function, and outer optimization for obtaining the optimal cost function. Generally, the outer optimization attempts to optimize the weights of the predefined cost function terms.

The cost function J for inner optimization may be defined as:

$$J(x_e, y_e, \theta_e, w, T, x(t), u(t)) = T + w_1 \int_0^T u_1^2 dt + w_2 \int_0^T u_2^2 dt + \\ w_3 \int_0^T u_1^2 dt + w_2 \int_0^T u_3^2 dt + w_4 \int_0^T \left(\arctan\left(\frac{y_e - y}{x_e - x}\right) - \theta\right)^2 dt \quad (13)$$

where ($x_e$, $y_e$, $\theta_e$) may be a goal pose represented in the robot's local frame at the robot initial pose, $w = (w_1, w_2, w_3, w_4)$ may be weights that are kept constant during inner optimization, and T may be the duration of the trajectory. The last term of Equation (13) may encourage the robot to face the goal.

According to one aspect, the trajectory may be represented by N+1 discrete states $x_k$ (K=0, 1, ..., N) and N inputs $u_k$ (k=0, 1, ..., N−1). Defining $X = [x_0^T x_1^T \ldots x_N^T]^T$ and $U = [u_0^T u_1^T \ldots u_{N-1}^T]^T$, the optimization problem may be formulated as:

$$T^*, X^*, Y^* = \arg\min J(x_e, y_e, \theta_e, w) \quad (14)$$

subject to inequality constraints from Equation (7)-Equation (12) and equality constraints:

$$x_0 = [0 \ 0 \ 0 \ 0 \ 0 \ 0]^T \quad (15)$$

$$x_N = [x_e \ y_e \ \theta_e \ 0 \ 0 \ 0]^T \quad (16)$$

$$x_{k+1} = x_k + \frac{T}{N} \dot{x}_k \quad (17)$$

$$x_k = \begin{bmatrix} x[k] \\ y[k] \\ \theta[k] \\ v_f[k] \\ v_o[k] \\ \omega[k] \end{bmatrix} \quad (18)$$

$$\dot{x}_k = \begin{bmatrix} v_f[k]\cos\theta[k] - v_o[k]\sin\theta[k] \\ v_f[k]\sin\theta[k] + v_o[k]\cos\theta[k] \\ \omega[k] \\ u_1[k] \\ u_2[k] \\ u_3[k] \end{bmatrix} \quad (19)$$

The trajectory may be obtained based on an inner optimization. The controller 120 may control movement of the robot body 110 toward the human target along the trajectory based on the inner optimization.

The cost function may be obtained based on an outer optimization and may be defined to include a set of cost function terms that consider the location of the person to approach or the human target.

The outer optimization may obtain the weights w such that the trajectories computed by the inner optimization are similar to observed human trajectories from the dataset. Assuming M observations with different goal poses ($x_{em}$, $y_{em}$, $\theta_{em}$) (m=1, 2, . . . , M) and denoting the position and orientation in the $m_{th}$ observation by ($x_{mk}$, $y_{mk}$, $\theta_{mk}$) (k=0, 1, . . . , N). The difference from the $m_{th}$ observed trajectory may be evaluated by:

$$Z_m(w) = \Sigma_{k=0}^{N}(\hat{x}_{mk} - x_m*[k])^2 \hat{y}_m*[k])^2 + c_\theta(\hat{\theta}_{mk} - \theta_m*[k])^2 \quad (20)$$

where $c_\theta$ may be a user defined constant and $x_m*$, $y_m*$, $\theta_m*$ may be the position and orientation components of the solution of inner optimization with w as the weights and ($x_{cm}$, $y_{cm}$, $\theta_{cm}$) as the goal. Using Equation (20), outer optimization may be defined as:

$$_w{}^{min}\Sigma_{m=1}^{M} Z_m(w) \quad (21)$$

subject to $0 \leq w \leq w_{max}$, where $w_{max}$ may be the vector of maximum weights.

Application to Human Approach

During a training phase, a dataset including human walking trajectories when approaching another human in an open space may be collected. This dataset may be used to train the controller 120 or may be used as ground truth and may be stored on the storage drive 146 of the server 140 or the storage drive 126 of the controller 120.

To emulate the scenario of approaching a human, a mannequin, or other similar object, may be placed in a motion capture area and a human participant may approach and eventually stand in front of the mannequin. The mannequin may be placed at multiple or different positions facing multiple different directions (e.g., eight directions). The human participant may start from multiple or different facing directions (e.g., three directions). According to this experiment, the total number of observed trajectories may be 48. These may be utilized for computing the optimal w and for cross validation, according to one aspect.

The final pose of the human participant may be determined form the mannequin's pose ($x_m$, $y_m$, $O_m$) as:

$$x_e = x_M - d \cos \theta_M \quad (22)$$

$$y_e = y_M - d \sin \theta_M \quad (23)$$

$$\theta_e = -\theta_M \quad (24)$$

where d may be a constant distance between the final positions of the human and mannequin. According to one aspect, d=0.8 may be selected based on the observed trajectories.

Curriculum Inverse Optimal Control

Since outer optimization may be non-linear, the problem may have a number of local minima. However, it may be computationally difficult to exhaustively search in the 4-dimensional parameter space for the global optimum.

In this regard, optimization of the parameters in stages by gradually introducing new or additional terms to the cost function for inner optimization may be performed. A first stage may use a cost function including merely the input terms:

$$J_1(w_2, w_3, u(t)) = \int_0^1 u_2^2 dt + w_2 \int_0^1 u_2^2 dt + w_3 \int_0^1 u_3^2 dt \quad (25)$$

where the fixed duration T may be computed by:

$$\hat{T} = 1.4 \max\left\{\frac{\sqrt{x_e^2 + y_e^2}}{v_{fmax}}, \frac{|\theta_e|}{\omega_{max}}\right\} \quad (26)$$

$w_1$ may be set to 1 because scaling $J_1$ by a constant does not affect the result. In the first stage, the initial values for $w_2$ and $w_3$ may be sampled and outer optimization may be performed for each of initial value. According to one aspect, T may be fixed during the first stage. During a second stage, the best set of weights may be utilized as an initial guess, which may include the duration term:

$$J_2(w_0, w_2, w_3, T, u(t)) = w_0 T + \int_0^T u_1^2 dt + w_2 \int_0^T u_2^2 dt + w_3 \int_0^T u_3^2 dt \quad (27)$$

where $w_0$ may be the weight for the duration. The initial values for $w_0$ may be uniformly sampled and $w_0$, $w_2$, $w_3$ may be optimized by outer optimization. Finally, the best weights may be used as the initial guess for the final stage, which uses a slightly modified version of Equation (20):

$$J_3(x_e, y_e, \theta_e, w_0, w_2, w_3, w_4, T, x(t), u(t)) = w_0 T + \int_0^T u_1^2 dt + \quad (28)$$
$$w_2 \int_0^T u_2^2 dt + w_3 \int_0^T u_3^2 dt + w_4 \int_0^T \left(\arctan\left(\frac{y_e - y}{x_e - x}\right) - \theta\right)^2 dt$$

Thus, the stages of optimization incrementally minimize the cost function by starting with an initial guess and optimizing results based on the initial guess.

Cost Function

The last term of Equation (28) may be replaced with a new term, resulting in:

$$(x_M, y_M, w_0, w_2, w_3, w_4', T, x(t), u(t)) = w_0 T + \int_0^T u_1^2 dt + \quad (29)$$
$$w_2 \int_0^T u_2^2 dt + w_3 \int_0^T u_3^2 dt + w_4' \int_0^T \frac{1}{\epsilon + (x_M - x)^2 + (y_M - y)^2} dt$$

where $\epsilon$ may be a small constant. This new term may produce an effect similar to social force by increasing the cost to be near the mannequin or human target. Stage 3' may be performed, in which $w_0$, $w_2$, $w_3$, $w_4'$ may be optimized using the optimal weights of stage 2 and uniformly sampled $w_4'$ as initial values. According to experiments, Stage 3' realizes approximately 36% improvement in accuracy for the training data set. The improvement for the test data set may be more modest at 8%.

In some cases, the optimized trajectory may include a detour compared with ground truth, which may be a side effect of the new term. To reduce this effect, another term may be added that reduces the centrifugal force. The cost function may be:

$$J_4(x_m, y_m, w_0, w_2, w_3, w_4', w_5, T, x(t), u(t)) = \quad (30)$$
$$w_0 T + \int_0^T u_1^2 dt + w_2 \int_0^T u_2^2 dt + w_3 \int_0^T u_3^2 dt +$$
$$w_4' \int_0^T \frac{1}{\epsilon + (x_M - x)^2 + (y_M - y)^2} dt + w_5 \int_0^T v^2 \omega^2 dt$$

At this point, all weights may be optimized and implemented in Equation (30). According to experiments, the centrifugal force term may achieve a modest improvement of approximately 3% in both training datasets and test datasets.

The cost function may include one or more terms, such as a first term, a second term, a third term, a fourth term, a fifth term, and a sixth term, etc.

The first term may be associated with a duration T of the trajectory for the inverse optimal control approach robot.

The second term may be associated with a social force and a final distance between the inverse optimal control approach robot and the human target. The social force may be modeled based on a term associated with the fifth term or $$\left( w'_4 \int_0^T \frac{1}{\epsilon + (x_M - x)^2 + (y_M - y)^2} dt \right).$$ Equation (30)

As previously discussed, the mannequin's pose or final pose of the human participant may be $(x_M, y_M, \theta_M)$, x, y may be the current position, and E may be a small constant. Therefore, the social force may be modeled based on the mannequin's pose (during the weight optimization phase or training phase) or final pose of the human, a current position of the inverse optimal control approach robot relative to the human target, and/or the small constant.

The third term may be associated with a lateral acceleration for the inverse optimal control approach robot.

The fourth term may be associated with an angular acceleration for the inverse optimal control approach robot.

The fifth term may be associated with a longitudinal acceleration for the inverse optimal control approach robot.

The third term, the fourth term, and the fifth term may be represented by the respective accelerations squared.

The sixth term may be associated with a reduction of centrifugal force applied to the robot body 110, thereby mitigating sharp turns.

In this way, the first term, the second term, the third term, the fourth term, the fifth term, and the sixth term may facilitate movement of the robot in a more predictable or readable manner.

The first term, the second term, the third term, the fourth term, the fifth term, and the sixth term may be associated with a first weight, a second weight, a third weight, a fourth weight, a fifth weight, and a sixth weight, respectively.

One or more of the first weight, the second weight, the third weight, the fourth weight, the fifth weight, or the sixth weight may be optimized in two or more stages. According to one aspect, weights of the cost function terms may be determined such that the observed human trajectories are generated by minimizing the cost function.

During a first stage of the two or more stages, the weights of less than all of the terms of the cost function may be considered for optimization while keeping the weights of the non-considered terms fixed. In other words, since the outer optimization may be nonlinear, this may mean that the problem has a number of local minima. In this regard, it may be computationally expensive to exhaustively search for a solution in a 4-dimensional parameter space for the global optimum. Therefore, by optimizing parameters in stages where additional terms are gradually introduced, efficient optimization may be provided. Stated another way, the parameters may be optimized in stages by gradually introducing new terms to the cost function for inner optimization.

During a first stage of two or more stages of optimization, the outer optimization may be based only on input terms to determine a first set of weights. Specifically, the first stage may use the cost function associated with Equation (25) and Equation (26):

$$J_1(w_2, w_3, u(t)) = \int_0^1 + w_2 \int_0^1 u_2^2 dt + w_3 \int_0^1 u_3^2 dt \quad (25)$$

where the fixed duration T may be computed by:

$$\hat{T} = 1.4 \max \left\{ \frac{\sqrt{x_e^2 + y_e^2}}{v_{fmax}}, \frac{|\theta_e|}{\omega_{max}} \right\} \quad (26)$$

During a second stage of the two or more stages of optimization, the outer optimization may be based on the first set of weights. Explained in greater detail, the first set of weights obtained in the first stage of optimization may be utilized as an initial guess in the second stage of the two or more stages of optimization. The outer optimization may be performed to obtain the optimal cost function by optimizing the weights of the predefined cost function terms. The outer optimization may obtain weights w such that trajectories computed according to the inner optimization are similar to observed trajectories or ideal trajectories. As discussed above, the outer optimization may be defined according to Equation (21):

$$\min_w \Sigma_{m=1}^M Z_m(w) \quad (21)$$

subject to $0 \leq w \leq w_{max}$, where $w_{max}$ may be the vector of maximum weights.

Evaluations of the optimized trajectories indicate that these inverse optimal control approaches are generally perceived as safer and more socially acceptable. In this way, adaptation of an inverse optimal control framework to a scenario where a human approaches another human by additional cost function terms may be provided. The design and execution of online and in-person user studies may be used to compare the human perception (e.g., from the dataset) of different robot trajectory shapes for approaching a human standing at the same location.

Figure 2:
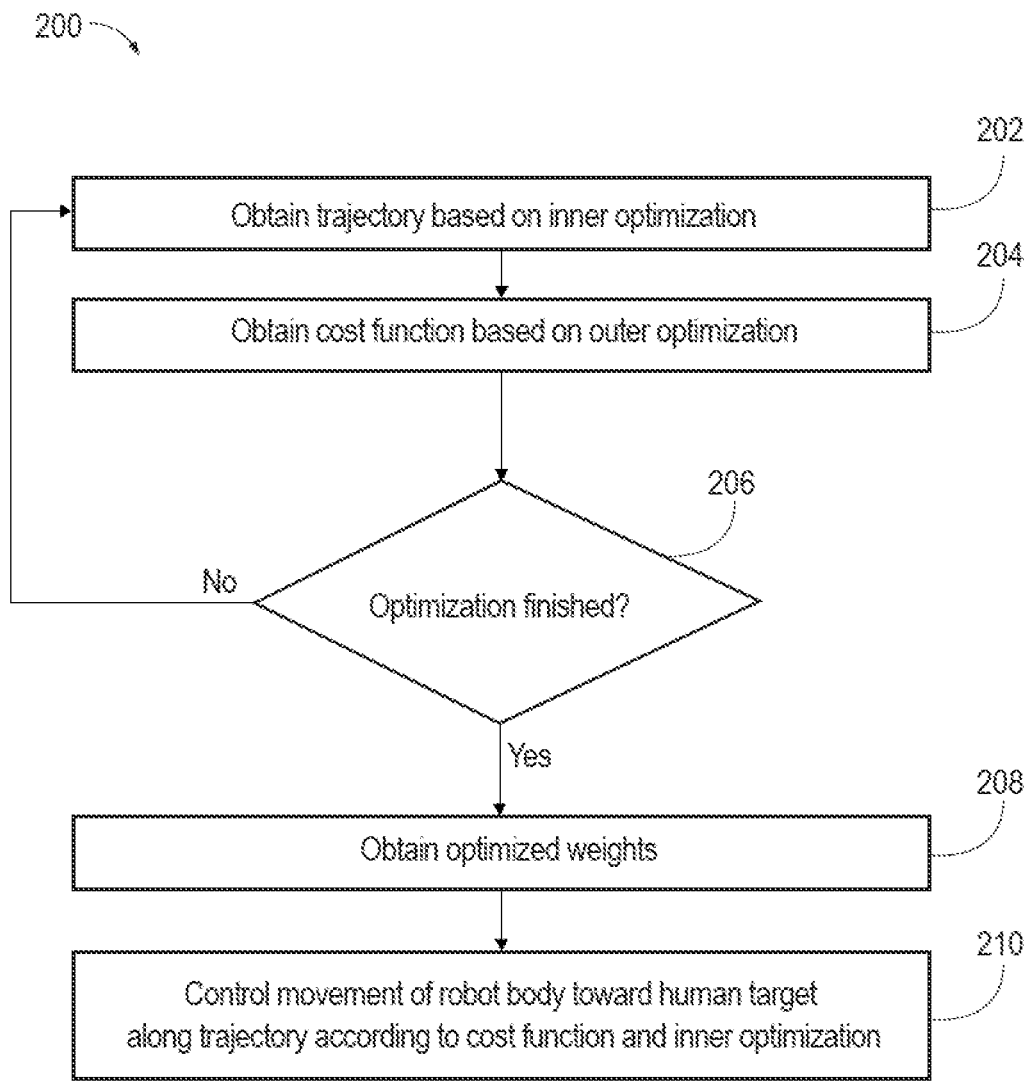
FIG. 2 is an exemplary flow diagram of a method for inverse optimal control approach, according to one aspect.

FIG. 2 is an exemplary flow diagram of a method 200 for inverse optimal control approach, according to one aspect. During weight optimization, both inner and outer optimization may be run repeatedly. During control of an inverse optimal control approach system or robot, merely the inner optimization may be executed.

The method 200 for inverse optimal control approach may include performing weight optimization by obtaining 202 a trajectory based on an inner optimization and obtaining 204 a cost function based on outer optimization. The inner and outer optimization may be run repeatedly until weight optimization is complete 206. Thereafter, the optimized weights may be obtained 208 for the cost function.

The method 200 for inverse optimal control approach may include controlling 210 movement of the robot body 110 toward a human target along a trajectory according to the cost function. The cost function may include a first term, a second term, a third term, a fourth term, a fifth term, and a sixth term. The first term may be associated with a duration of the trajectory for the robot body 110. The second term may be associated with a social force and a final distance between the robot body 110 and the human target. The third term may be associated with a lateral acceleration for the robot body 110. The fourth term may be associated with an angular acceleration for the robot body 110. The fifth term may be associated with a longitudinal acceleration for the robot body 110. The sixth term may be associated with a reduction of centrifugal force applied to the robot body 110.

The first term, the second term, the third term, the fourth term, the fifth term, and the sixth term may be associated with a first weight, a second weight, a third weight, a fourth weight, a fifth weight, and a sixth weight, respectively. The inverse optimal control approach method may include optimizing one or more of the first weight, the second weight, the third weight, the fourth weight, the fifth weight, or the sixth weight during two or more stages. During a first stage of the two or more stages, the weights of less than all of the terms of the cost function may be considered for optimization while keeping the weights of the non-considered terms fixed.

Figure 4:
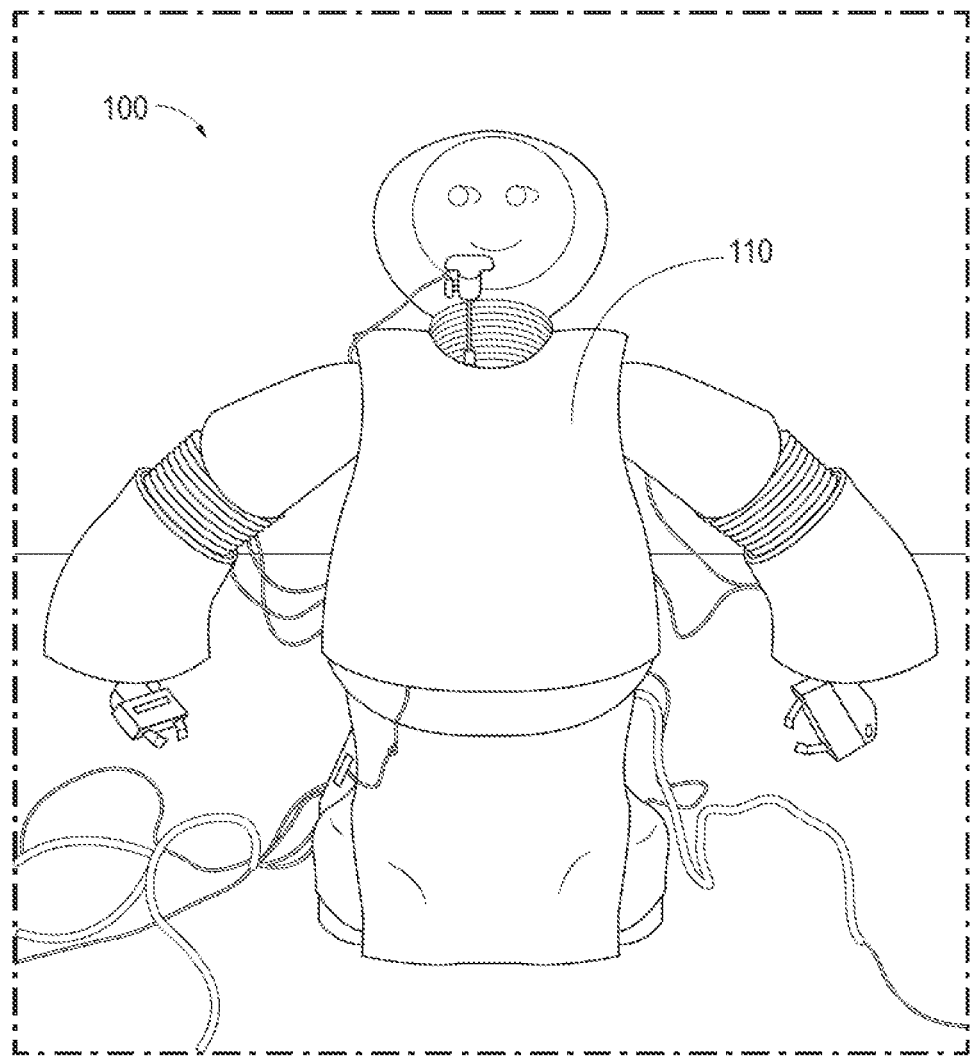
FIG. 4 is an exemplary illustration of a system or robot for inverse optimal control approach, according to one aspect.
Figure 5:
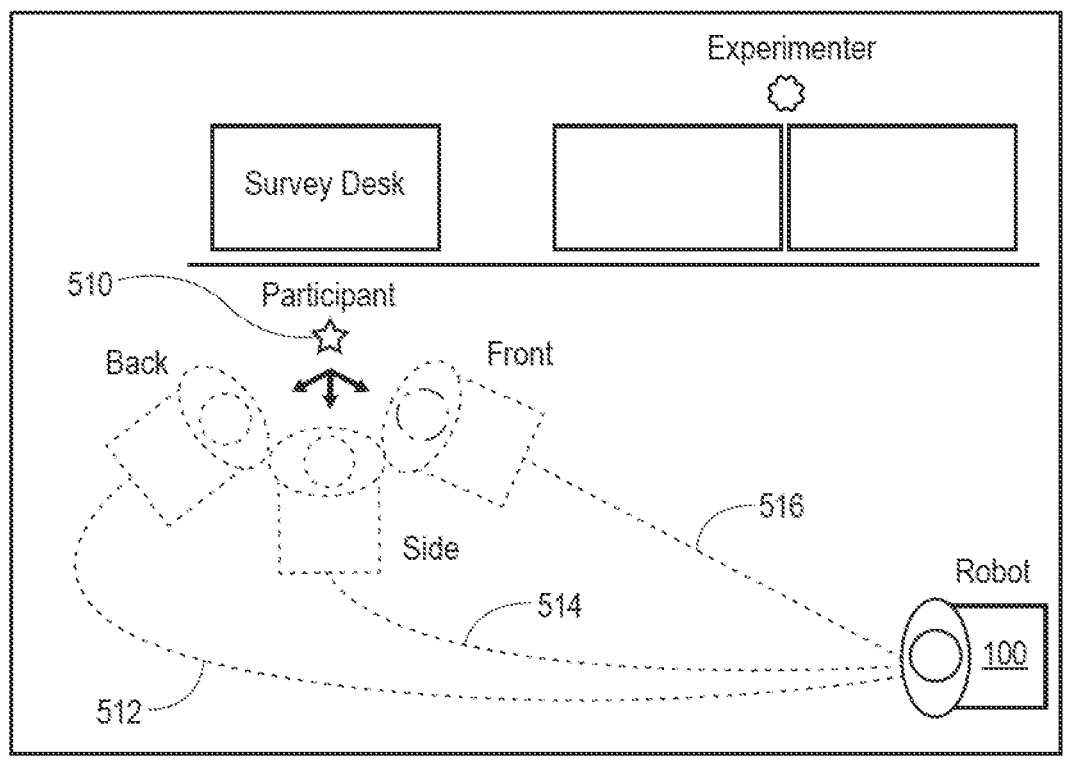
FIG. 5 is an exemplary illustration of an implementation of a system or robot for inverse optimal control approach, according to one aspect.

FIG. 3 is an exemplary diagram of a system or robot for inverse optimal control approach, according to one aspect where an angular velocity $\omega$, a forward or longitudinal velocity $v_f$, a lateral velocity $v_o$, and orientation $\theta$ are depicted. FIG. 4 is an exemplary illustration of an exemplary system or robot for inverse optimal control approach, according to one aspect. FIG. 5 is an exemplary illustration of an implementation of a system or robot for inverse optimal control approach during a training phase, according to one aspect. During this training phase, an experimenter may observe a participant's reactions to different paths 512, 514, 516 or trajectories, taken by the robot or system described above.

Figure 6A:
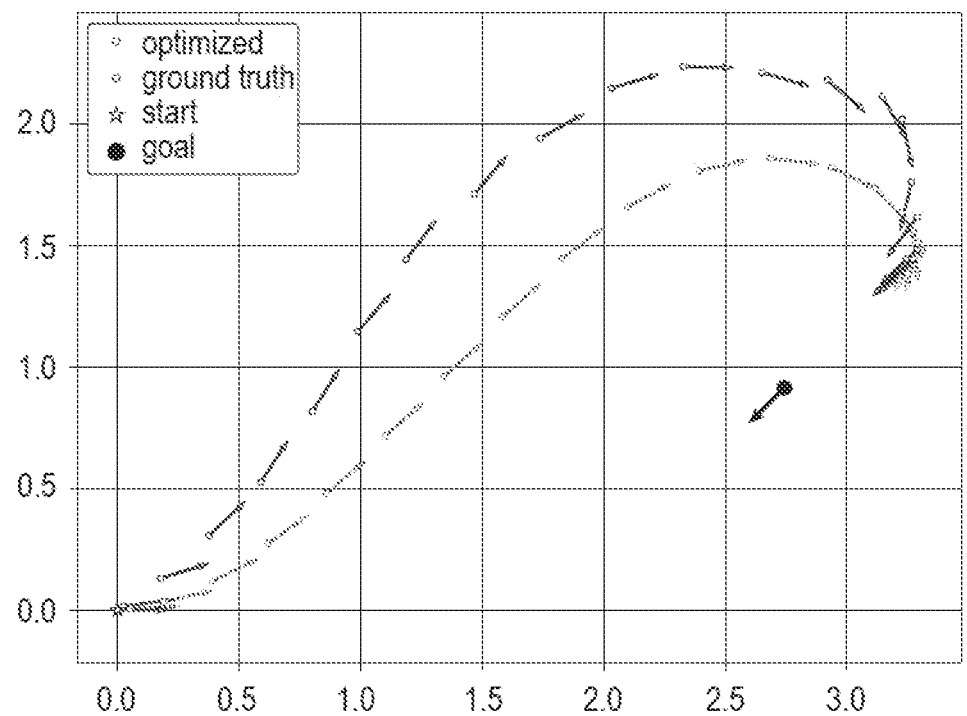
FIGS. 6A-6D are exemplary graphs of paths associated with a system or robot for inverse optimal control approach, according to one aspect.
Figure 6B:
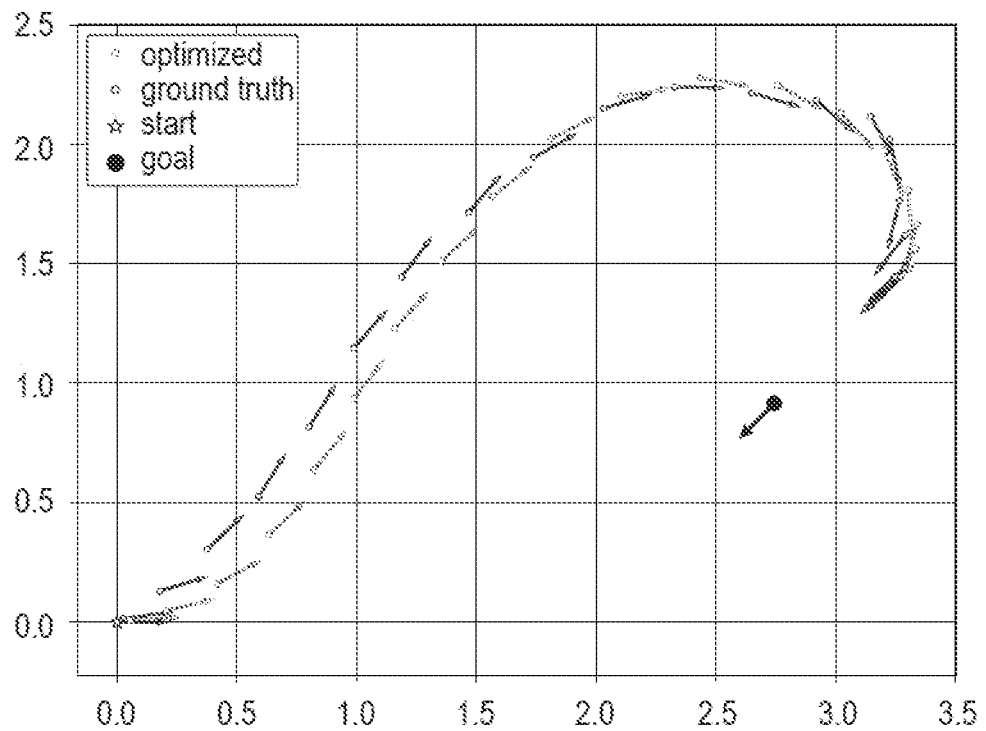
Figure 6C:
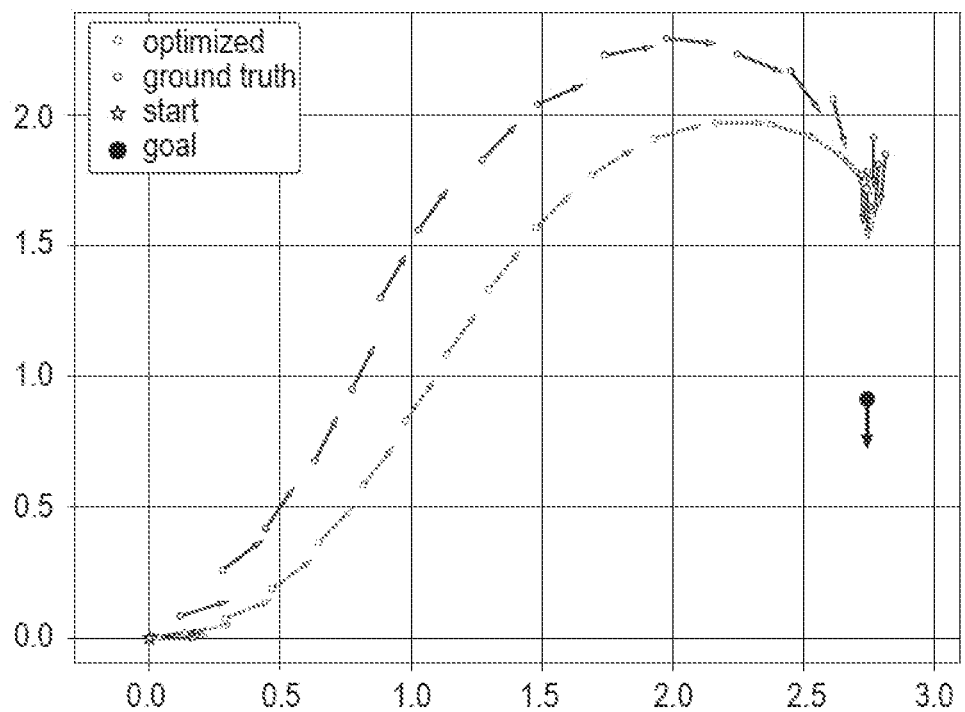
Figure 6D:
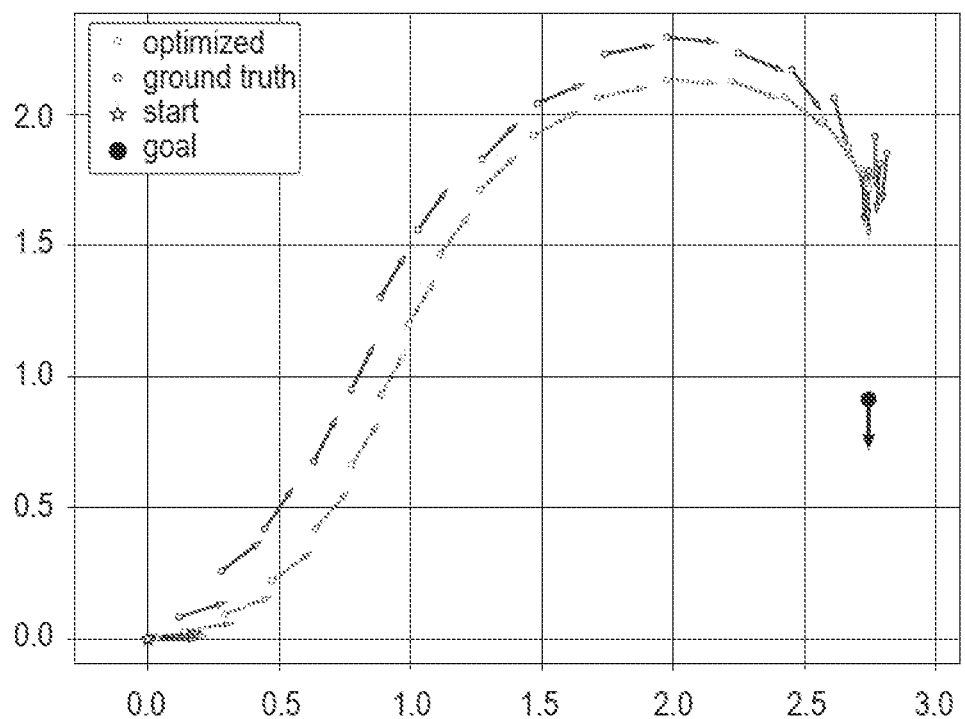

FIGS. 6A-6D are exemplary graphs of paths associated with a system or robot for inverse optimal control approach, according to one aspect. FIGS. 6A-6B compare the trajectories optimized using Equations (28) and (29) with the ground truth for a trajectory used for weight optimization, while FIGS. 6C-6D illustrate optimized trajectories for those that are not part of the training data set.

Figure 7:
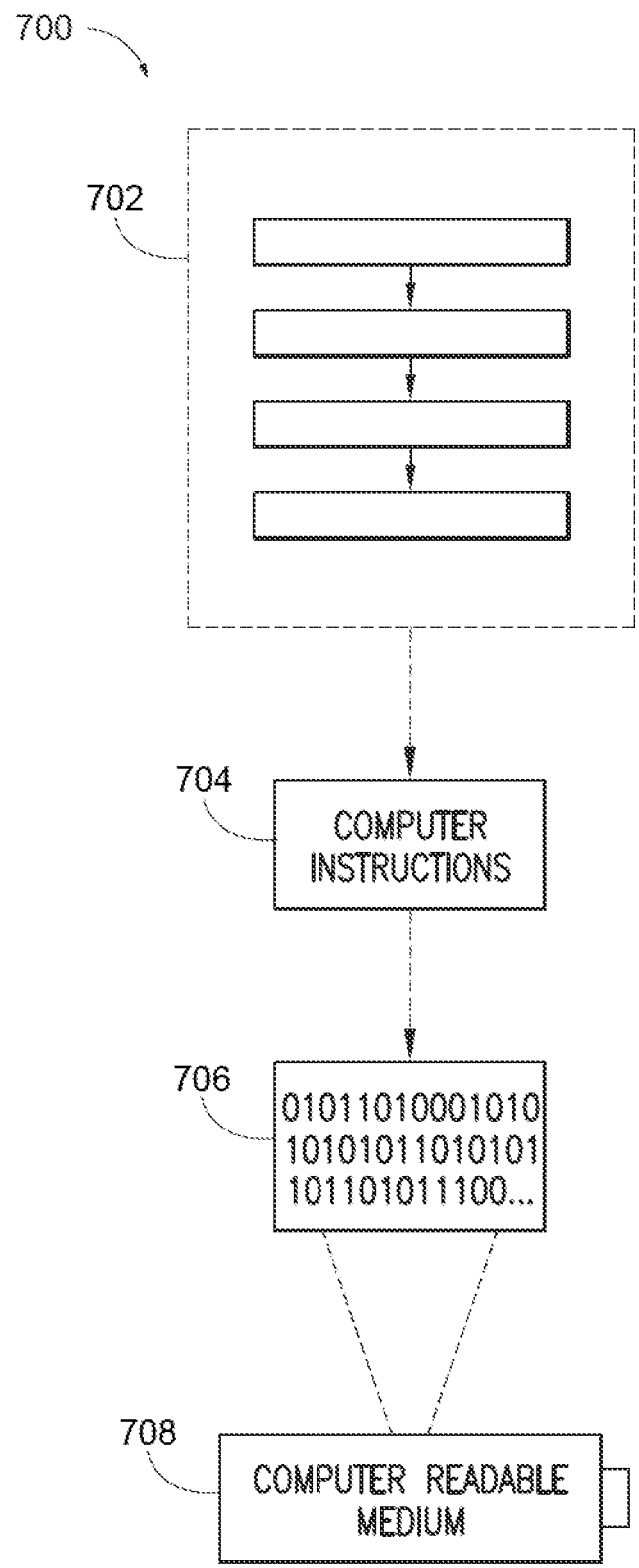
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 200 of FIG. 2. In another aspect, the processor-executable computer instructions 704 may be configured to implement a system, such as the system 100 or robot of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
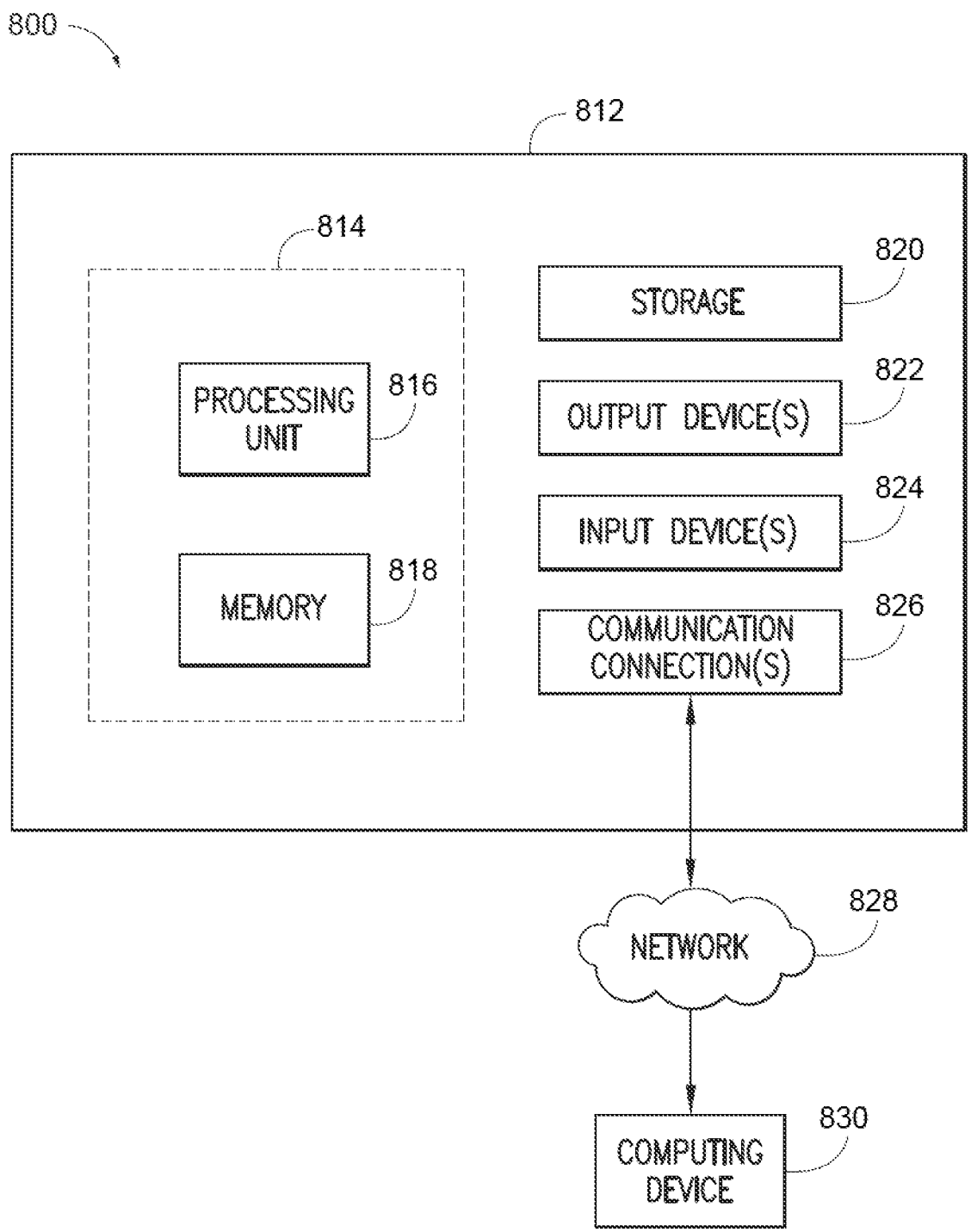
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An inverse optimal control approach robot, comprising:
a robot body; and
a controller controlling movement of the robot body toward a human target along a trajectory according to a cost function,
wherein the cost function includes a plurality of terms including a first term, a second term, and additional terms,
wherein the first term is associated with a duration of the trajectory for the inverse optimal control approach robot,
wherein the second term is associated with a social force and a final distance between the inverse optimal control approach robot and the human target,
wherein one or more of weights of the plurality of terms are optimized in two or more stages and at least one of the terms of the plurality of terms is introduced into the cost function after a first stage of the two or more stages, and
wherein the plurality of terms included in the cost function in the first stage consist of input terms, and the plurality of terms included in the cost function in a subsequent stage of the two or more stages include the at least one of the terms of the plurality of terms differing from the input terms included in the first stage.

2. The inverse optimal control approach robot of claim 1, wherein the cost function includes the plurality of terms including the first term, the second term, a third term, a fourth term, a fifth term, and a sixth term,
wherein the third term is associated with a lateral acceleration for the inverse optimal control approach robot,
wherein the fourth term is associated with an angular acceleration for the inverse optimal control approach robot,
wherein the fifth term is associated with a longitudinal acceleration for the inverse optimal control approach robot,
wherein the sixth term is associated with a reduction of centrifugal force applied to the robot body, and
wherein the first term, the second term, the third term, the fourth term, the fifth term, and the sixth term are associated with the weights including a first weight, a second weight, a third weight, a fourth weight, a fifth weight, and a sixth weight, respectively.

3. The inverse optimal control approach robot of claim 2, wherein one or more of the first weight, the second weight, the third weight, the fourth weight, the fifth weight, or the sixth weight are optimized in the two or more stages.

4. The inverse optimal control approach robot of claim 3, wherein during the first stage of the two or more stages, the weights of less than all of the terms of the cost function are considered for optimization while keeping the weights of non-considered terms fixed.

5. The inverse optimal control approach robot of claim 1, wherein the social force is modeled based on a current position of the inverse optimal control approach robot relative to the human target.

6. The inverse optimal control approach robot of claim 1, wherein the trajectory is obtained based on an inner optimization.

7. The inverse optimal control approach robot of claim 6, wherein the controller controls movement of the robot body toward the human target along the trajectory based on the inner optimization.

8. The inverse optimal control approach robot of claim 1, wherein the cost function is obtained based on an outer optimization.

9. The inverse optimal control approach robot of claim 8, wherein during the first stage of the two or more stages of optimization, the outer optimization is based only on the input terms to determine a first set of weights.

10. The inverse optimal control approach robot of claim 9, wherein during a second stage of the two or more stages of optimization, the outer optimization is based on the first set of weights.

11. An inverse optimal control approach system, comprising:
a robot body; and
a controller controlling movement of the robot body toward a human target along a trajectory according to a cost function,
wherein the cost function includes a plurality of terms including a first term, a second term, and additional terms,
wherein the first term is associated with a duration of the trajectory for the robot body,
wherein the second term is associated with a social force and a final distance between the robot body and the human target,
wherein one or more of weights of the plurality of terms are optimized in two or more stages and at least one of the terms of the plurality of terms is introduced into the cost function after a first stage of the two or more stages, and
wherein the plurality of terms included in the cost function in the first stage consist of input terms, and the plurality of terms included in the cost function in a subsequent stage of the two or more stages include the at least one of the terms of the plurality of terms differing from the input terms included in the first stage.

12. The inverse optimal control approach system of claim 11,
wherein the cost function includes the plurality of terms including the first term, the second term, a third term, a fourth term, a fifth term, and a sixth term,
wherein the third term is associated with a lateral acceleration for the robot body,
wherein the fourth term is associated with an angular acceleration for the robot body,
wherein the fifth term is associated with a longitudinal acceleration for the robot body,
wherein the sixth term is associated with a reduction of centrifugal force applied to the robot body, and
wherein the first term, the second term, the third term, the fourth term, the fifth term, and the sixth term are associated with the weights including a first weight, a second weight, a third weight, a fourth weight, a fifth weight, and a sixth weight, respectively.

13. The inverse optimal control approach system of claim 12, wherein one or more of the first weight, the second weight, the third weight, the fourth weight, the fifth weight, or the sixth weight are optimized in the two or more stages.

14. The inverse optimal control approach system of claim 13, wherein during the first stage of the two or more stages, the weights of less than all of the terms of the cost function are considered for optimization while keeping the weights of non-considered terms fixed.

15. The inverse optimal control approach system of claim 11, wherein the social force is modeled based on a current position of the robot body relative to the human target.

16. The inverse optimal control approach system of claim 11, wherein the trajectory is obtained based on an inner optimization.

17. An inverse optimal control approach method, comprising:
optimizing a cost function; and
controlling movement of a robot body toward a human target along a trajectory according to the cost function,
wherein the cost function includes a plurality of terms including a first term, a second term, a third term, and additional terms,
wherein the first term is associated with a duration of the trajectory for the robot body,
wherein the second term is associated with a social force and a final distance between the robot body and the human target,
wherein the third term is associated with an acceleration for the robot body,
wherein one or more of weights of the plurality of terms are optimized in two or more stages and at least one of the terms of the plurality of terms is introduced into the cost function after a first stage of the two or more stages, and
wherein the plurality of terms included in the cost function in the first stage consist of input terms, and the plurality of terms included in the cost function in a subsequent stage of the two or more stages include the at least one of the terms of the plurality of terms differing from the input terms included in the first stage.

18. The inverse optimal control approach method of claim 17,
wherein the cost function includes the plurality of terms including the first term, the second term, the third term, a fourth term, a fifth term, and a sixth term,
wherein the third term is associated with a lateral acceleration for the robot body,
wherein the fourth term is associated with an angular acceleration for the robot body,
wherein the fifth term is associated with a longitudinal acceleration for the robot body,
wherein the sixth term is associated with a reduction of centrifugal force applied to the robot body, and
wherein the first term, the second term, the third term, the fourth term, the fifth term, and the sixth term are associated with the weights including a first weight, a second weight, a third weight, a fourth weight, a fifth weight, and a sixth weight, respectively.

19. The inverse optimal control approach method of claim 18, comprising optimizing one or more of the first weight, the second weight, the third weight, the fourth weight, the fifth weight, or the sixth weight during the two or more stages.

20. The inverse optimal control approach method of claim 19, wherein during the first stage of the two or more stages, the weights of less than all of the terms of the cost function are considered for optimization while keeping the weights of non-considered terms fixed.

* * * * *